(12) United States Patent
Kwak

(10) Patent No.: US 9,081,636 B2
(45) Date of Patent: Jul. 14, 2015

(54) DISPLAY APPARATUS, SYSTEM, AND APPLICATION PROGRAM CONTROL METHOD THEREOF

(75) Inventor: Ki-won Kwak, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 740 days.

(21) Appl. No.: 12/847,263

(22) Filed: Jul. 30, 2010

(65) Prior Publication Data

US 2011/0093845 A1 Apr. 21, 2011

(30) Foreign Application Priority Data

Oct. 19, 2009 (KR) .................. 10-2009-0099368

(51) Int. Cl.
*G06F 9/44* (2006.01)
*G06F 9/445* (2006.01)

(52) U.S. Cl.
CPC ... *G06F 8/60* (2013.01); *G06F 8/65* (2013.01); *G06F 8/67* (2013.01)

(58) Field of Classification Search
CPC ............... G06F 8/60; G06F 8/61; G06F 8/65; G06F 8/67
See application file for complete search history.

(56) References Cited

U.S. PATENT DOCUMENTS

| | | | | |
|---|---|---|---|---|
| 6,470,496 B1* | 10/2002 | Kato et al. | .............. | 717/173 |
| 6,832,323 B1* | 12/2004 | Booth et al. | .............. | 726/21 |
| 7,007,077 B1* | 2/2006 | Shinohara et al. | .............. | 709/220 |
| 7,673,297 B1* | 3/2010 | Arsenault et al. | .............. | 717/168 |
| 7,715,593 B1* | 5/2010 | Adams et al. | .............. | 382/115 |
| 8,015,267 B2* | 9/2011 | Patel | .............. | 709/220 |
| 8,261,256 B1* | 9/2012 | Adler et al. | .............. | 717/173 |
| 8,528,037 B2* | 9/2013 | Neill | .............. | 725/132 |
| 2002/0059629 A1 | 5/2002 | Markel | | |
| 2003/0050932 A1* | 3/2003 | Pace et al. | .............. | 707/100 |
| 2006/0059480 A1* | 3/2006 | Kimoto | .............. | 717/172 |
| 2007/0234348 A1* | 10/2007 | Kelso et al. | .............. | 717/174 |

(Continued)

FOREIGN PATENT DOCUMENTS

| | | | |
|---|---|---|---|
| EP | 1234451 A1 | 5/2001 | |
| GB | 2403105 A | 12/2004 | |

OTHER PUBLICATIONS

Wey, J.S.; Luken, J.; Heiles, J., Standardization Activities for IPTV Set-Top Box Remote Management, [Online] 2009, Internet Computing, IEEE, vol. 13, No. 3, May-Jun. 2009, [Retrieved from the Internet] <http://ieeexplore.ieee.org/stamp/stamp.jsp?tp=&arnumber=4907684&isnumber=4907674> p. 32-39.*

(Continued)

*Primary Examiner* — Thuy Dao
*Assistant Examiner* — Ravi K Sinha
(74) *Attorney, Agent, or Firm* — Sughrue Mion, PLLC

(57) ABSTRACT

Provided are an a display apparatus, a system and a control method thereof for a display apparatus, comprising: a video signal processing unit which processes a video signal; a display unit which displays the processed video signal; a storage unit which stores ID information of the display apparatus; a communication unit which performs network communication based on an internet protocol (IP) with an external apparatus; and a control unit which downloads an application program determined to correspond to the ID information transmitted through the communicating unit from the external apparatus to execute the application program so that a predetermined function can be performed.

34 Claims, 6 Drawing Sheets

(56) References Cited

U.S. PATENT DOCUMENTS

| | | | |
|---|---|---|---|
| 2008/0271122 A1* | 10/2008 | Nolan et al. | 726/4 |
| 2009/0031409 A1* | 1/2009 | Murray | 726/10 |
| 2009/0058868 A1* | 3/2009 | Kang et al. | 345/581 |
| 2009/0172722 A1* | 7/2009 | Kahn et al. | 725/31 |
| 2009/0235244 A1* | 9/2009 | Enomori et al. | 717/170 |
| 2009/0319848 A1* | 12/2009 | Thaper | 714/748 |
| 2010/0083322 A1* | 4/2010 | Rouse | 725/93 |
| 2010/0235433 A1* | 9/2010 | Ansari et al. | 709/220 |
| 2010/0250787 A1* | 9/2010 | Miyata | 710/9 |
| 2011/0138409 A1* | 6/2011 | Svensson et al. | 725/25 |
| 2011/0166925 A1* | 7/2011 | Khare et al. | 705/14.43 |
| 2011/0213681 A1* | 9/2011 | Shahid | 705/27.1 |
| 2013/0117854 A1* | 5/2013 | Britton et al. | 726/24 |

OTHER PUBLICATIONS

Edwards, W.K.; Newman, M.W.; Smith, T.F.; Sedivy, J.; Izadi, S., An extensible set-top box platform for home media applications, [Online] 2005, Consumer Electronics, IEEE Transactions on , vol. 51, No. 4, Nov. 2005, [Retrieved from the Internet] <http://ieeexplore.ieee.org/stamp/stamp.jsp?tp=&arnumber=1561841&isnumber=33160> pp. 1175-1181.*

Aciicmez, O.; Seifert, J.-P.; Xinwen Zhang, A Secure DVB Set-Top Box via Trusting Computing Technologies, [Online] 2009 Consumer Communications and Networking Conference, 2009. CCNC 2009. 6th IEEE, Jan. 10-13, 2009, [Retrieved from the Internet] <http://ieeexplore.ieee.org/stamp/stamp.jsp?tp=&arnumber=4784777&isnumber=4784684> pp. 1-8.*

Communication dated Sep. 15, 2011 issued by the European Patent Office in the counterpart European Patent Application No. 10177467.7.

Extended European Search Report issued on Nov. 16, 2010 in counterpart European Application No. 10177467.7.

* cited by examiner

DISPLAY APPARATUS, SYSTEM, AND APPLICATION PROGRAM CONTROL METHOD THEREOF

CROSS-REFERENCE TO RELATED APPLICATION

This application claims priority from Korean Patent Application No. 10-2009-0099368, filed on Oct. 19, 2009 in the Korean Intellectual Property Office, the disclosure of which is incorporated herein by reference in its entirety.

BACKGROUND

1. Field

Apparatuses and methods consistent with the present inventive concept relate to a display apparatus, a system thereof and an application program control method thereof, and more particularly, to a display apparatus, a system thereof and an application program control method thereof which automatically updates, from an external apparatus, an application program corresponding to information about a display apparatus performing an internet protocol (IP) based network communication.

2. Description of the Related Art

In case of a related art display apparatus, since an application program is previously installed, it is inconvenient for a user to frequently check for updates with respect to the installed application program. Also, in case of an internet protocol based display apparatus, a specific application program is downloaded from an external source for installation on the display apparatus. This specific application is unrelated to model information, a firmware, regional information or set language of a display apparatus. Recently, the model of the display apparatus has been innumerably diversified, and content information to be supplied depending on a region has also been diversified. Therefore, for user's convenience, a display apparatus allowing an application program to be diversified considering the model information, the firmware information, the regional information, and the set language of the display apparatus is needed. Also, a display apparatus that allows the installed application program to be easily updated is needed.

SUMMARY OF THE INVENTION

According to an aspect of the present inventive concept, there is provided a display apparatus, including: a communication unit which performs network communication based on an internet protocol (IP) with an external apparatus; and a control unit which downloads an application program previously determined to correspond to an identification (ID) information of the display apparatus transmitted through the communication unit from the external apparatus to be executed by the display apparatus so that a predetermined function can be performed.

The ID information includes at least one of model information of the display apparatus, firmware information of the display apparatus, region or nation information of the display apparatus and a set language for the display apparatus.

The control unit controls the storage unit to store authority information corresponding to the ID information received from the external apparatus.

The display apparatus further includes a message generating unit which generates a message requesting information about an application program determined to correspond to the authority information, wherein the control unit controls the communication unit to transmit the generated message to the external apparatus, and to receive information about an application program identified in the transmitted message.

The display apparatus further includes a comparison unit which compares the received information about an application program, and information about an application program installed in the display apparatus, wherein the control unit performs updating of an application program depending on a comparison result of the comparison unit.

The control unit controls the message generating unit to generate a message requesting information of all application programs that can be installed based on the corresponding authority information, and the control unit controls the communication unit to transmit the generated message to the external apparatus, and to receive information about an application program identified in the transmitted message.

According to another aspect of the present inventive concept, there is provided a display apparatus system, comprising: a display apparatus which includes a video signal processing unit processing a video signal, a display unit displaying the processed video signal, a storage unit storing an ID information of the display apparatus, a communication unit performing a network communication based on an internet protocol (IP) with an external apparatus, and a control unit downloading an application program determined to correspond to the ID information transmitted through the communication unit from the external apparatus to execute the application program so that a predetermined function can be performed; and an external apparatus which includes a communication unit performing an IP based network communication with the display apparatus, and a storage unit storing an application program corresponding to the ID information of the display apparatus received by the communication unit.

The external apparatus further includes an authority information generating unit, and a control unit which controls the authority information generating unit to generate authority information to correspond to the received ID information and the communication unit to transmit to a corresponding display apparatus the authority information.

The control unit controls the storage unit to store the generated authority information and the corresponding ID information.

The external apparatus further includes a confirmation unit confirming the authority information, and the control unit controls the confirmation unit to confirm whether there is authority information corresponding to the received ID information.

The control unit controls the communication unit to transmit information about a predetermined application program identified in the message to the display apparatus and if an authority information of which is confirmed to correspond to the received ID information, a message requesting information about the predetermined application program corresponding to the authority information is received.

According to another aspect of the present inventive concept, there is provided a control method of a display apparatus system, the control method comprising: transmitting an ID information of a display apparatus to an external apparatus; and downloading an application program determined to correspond to the ID information from the external apparatus to execute the application program, and performing a predetermined function using the executed application program.

The ID information includes at least one of model information, firmware information, region or nation information and a set language for the display apparatus.

The method further includes generating by an external apparatus authority information that corresponds to the ID information and that is transmitted to the display apparatus, and storing the generated authority information and the corresponding ID information in a storage unit of the external apparatus.

The method further includes storing the received authority information in a storage unit of the display apparatus.

The method further includes transmitting to the external apparatus a message generated in a message generating unit of the display apparatus to request information of an application program previously determined to correspond to the authority information, and receiving information identified in the message from the external apparatus.

The control method further includes comparing information about an application program received in response to the message and information about an application program installed in the display apparatus, and performing an updating of the installed application program depending on a comparison result.

The control method further includes transmitting to the external apparatus a message generated in a message generating unit of the display apparatus to request information of all application programs that can be installed and correspond to the authority information, and receiving information about the application programs identified in the message from the external apparatus.

In this method, the application program includes a program which supplies at least one widget service to the display apparatus, and which displays data information on the display apparatus. The data information includes one or more of an electronic program guide (EPG) information, news, weather, stock, fortune, and motion picture service.

According to another aspect, a computer readable medium storing software instructions for a control method of a display apparatus is provided. The method includes transmitting to an external apparatus an identification (ID) information of a display apparatus, downloading to the display apparatus from the external apparatus an application program determined to correspond to the ID information, and performing a predetermined function using the downloaded application program.

According to yet another aspect, a method of controlling an application program of a display apparatus is provided. This control method includes providing information identifying type of a display apparatus, determining at least one application program that is configured to execute in the display apparatus, and executing the at least one application program that is determined to be configured for execution on the display apparatus.

According to yet another aspect, a display apparatus is provided. The display apparatus includes a communication unit which communicates information identifying type of a display apparatus and a control unit which determines at least one application program that is configured to execute in the display apparatus and which controls execution of the at least one application program that is determined to be configured for execution on the display apparatus.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
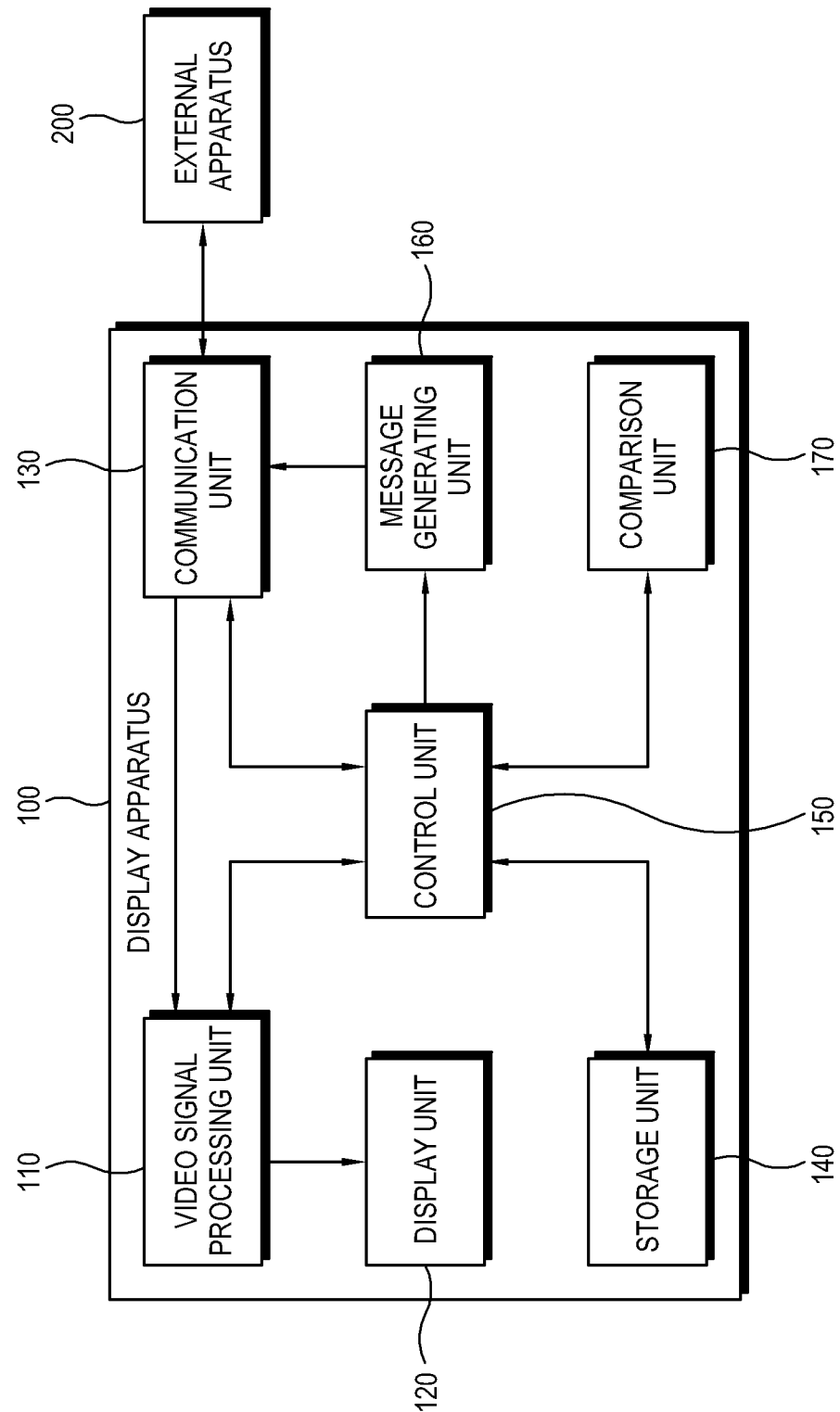
FIG. 1 is a block diagram of a display apparatus according to an exemplary embodiment of the present invention.

Below, exemplary embodiments will be described in detail with reference to accompanying drawings so as to be easily realized by a person having ordinary skill in the art. The present inventive concept may be embodied in various forms without being limited to the exemplary embodiments set forth herein. Descriptions of well-known parts are omitted for clarity, and like reference numerals refer to like elements throughout.

FIG. 1 is a block diagram of a display apparatus according to an exemplary embodiment of the present invention.

As shown in FIG. 1, a display apparatus 100 in this exemplary embodiment includes a video signal processing unit 110, a display unit 120, a communication unit 130, a storage unit 140, a control unit 150, a message generating unit 160 and a comparison unit 170.

The video signal processing unit 110 processes a video signal received from an external source so as to be displayed in the display unit 120 of the display apparatus. The video signal may be received from the communication unit 130. Alternatively, the display apparatus in an exemplary embodiment may further include a receiver unit (not shown) receiving a broadcasting signal sent from a broadcasting station, and the receiver unit may include a tuner unit (not shown). Also, the display apparatus in an exemplary embodiment may further include a second receiver unit (not shown) receiving the video signal from an external electronic apparatus of all types that transmit a video signal, such as a personal computer (PC), a digital versatile disk (DVD) player, a blu-ray disk (BD) player, a personal video recorder (PVR), etc.

Furthermore, the display apparatus in an exemplary embodiment may further include an audio signal processing unit (not shown) and a speaker (not shown). Accordingly, the audio signal processing unit may process an audio signal received from an external source, and output the processed audio signal in the speaker.

The display unit 120 may display the video signal processed in the video signal processing unit 110, and may include various display panels such as a liquid crystal display (LCD), a light emitting diode (LED), a plasma display panel (PDP), etc.

Figure 2:
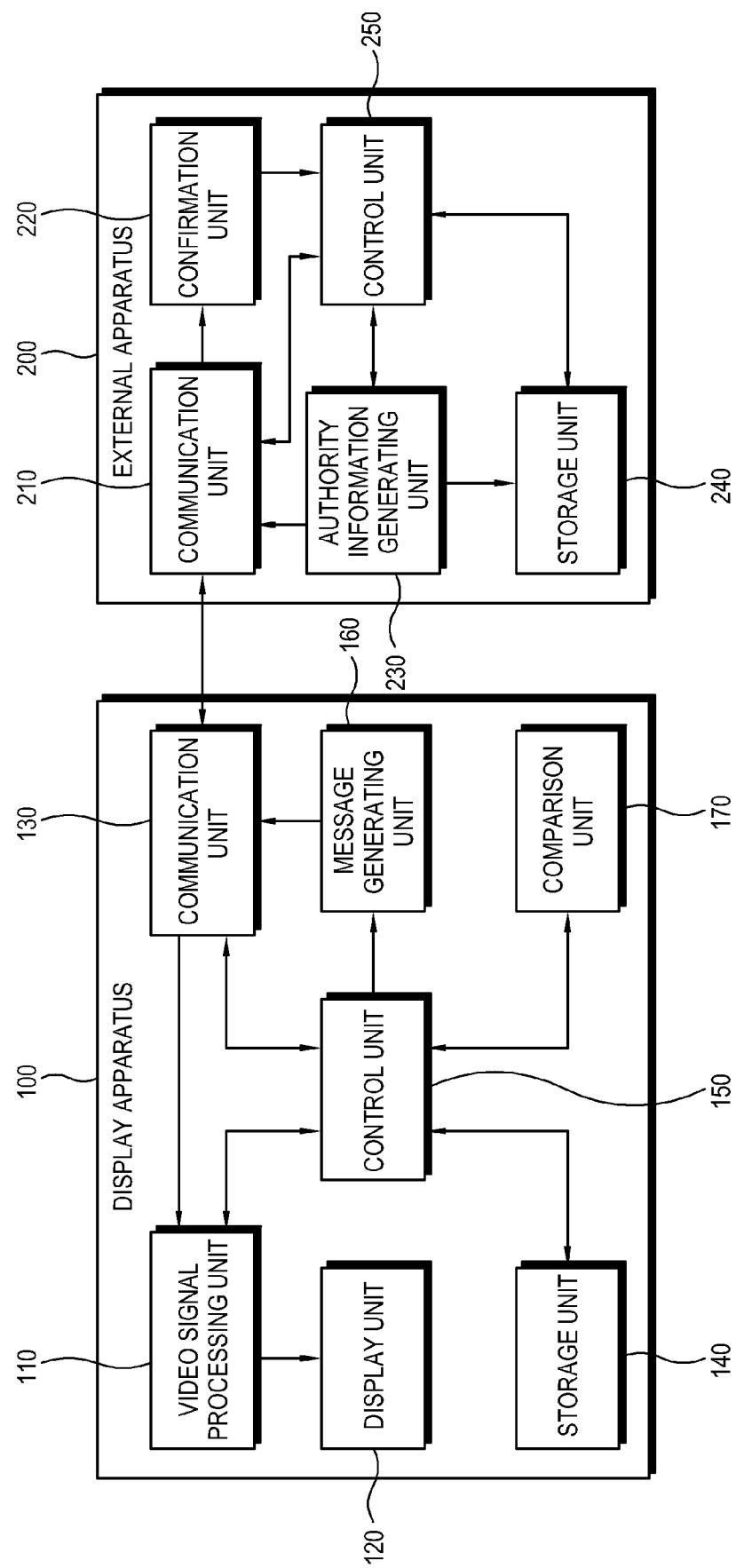
FIG. 2 is a block diagram of a display apparatus system according to an exemplary embodiment of the present invention.

The communication unit 130 may perform a network communication based on an internet protocol (IP) with an external apparatus 200, exemplary details of which are provided in FIG. 2. The communication unit 130 may perform an IP based wire or wireless network communication. Accordingly, the communication unit 130 may perform a wire network communication connected by a cable, a coaxial cable or an optical cable. Furthermore, the communication unit 130 may perform a wireless network communication such as a wireless wide area network (WWAN) performing a communication intermediated by a base station of a portable terminal or a wireless local area network (WLAN) performing a communication intermediated by an access point (AP) to be connected to an internet. Accordingly, the communication unit 130 may include a communication protocol necessary for the wire or wireless network communication.

The external apparatus 200 may include a PC, a server or a web server according to an exemplary embodiment.

The storage unit 140 may store identification (ID) information of the display apparatus according to an exemplary embodiment. The ID information of the display apparatus may include at least one of model information including a manufacture date of the display apparatus, firmware information, region information or nation information, and language set for the display apparatus.

Also, the storage unit 140 may further include authority information, received from the external apparatus 200 that corresponds to the ID information of the display apparatus. The authority information means that information of an application program which the display apparatus is capable of receiving from an external apparatus is different depending on the ID information of the display apparatus. For example, the authority information is different depending on the model information of the display apparatus, and the information of the application program received from the external apparatus is different depending on the different authority information. Accordingly, the authority information received from the external apparatus is different depending on each of the firmware of the display apparatus, the region/nation and the language set for the display apparatus, and the information that the application program is capable of receiving from the external apparatus is different depending on the authority information.

The control unit 150 may download an application program previously determined to correspond to ID information through the communication unit 130 from the external apparatus by a push method (without an additional request from the display apparatus), and execute the downloaded application program to perform a predetermined function.

The control unit 150 controls the communication unit 130 to transmit the ID information of the display apparatus stored in the storage unit 140 to the external apparatus, and downloads and executes an application program (previously determined to correspond to the transmitted ID information) from the external apparatus by the push method to perform a predetermined function.

The control unit 150 may confirm whether or not the communication unit 130 performs a communication operation. Accordingly, if the communication unit 130 performs the communication operation, the control unit 150 controls the communication unit 130 to transmit the ID information of the display apparatus stored in the storage unit 140 to the external apparatus, and downloads an application program previously determined to correspond to the transmitted ID information from the external apparatus by the push method in order to execute the transmitted application program, which thereby performs a predetermined function.

Here, the communication operation of the communication unit 130 includes a preparation for the communication unit 130 to perform wire or wireless network communications with an external apparatus. If an electric power necessary for the communication operation of the communication unit 130 is supplied, the communication unit 130 may prepare for performing the wire or wireless network communication with the external apparatus.

Furthermore, the display apparatus in an exemplary embodiment may include a user input unit (not shown) for inputting an electric power on/off signal. If an electric power on signal is input from the user input unit, the communication unit 130 may prepare for performing communication and perform the communication, and the control unit 150 may check to confirm that the communication unit 130 performs the communication operation. Therefore, if the electric power on signal is input from the user input unit, the control unit 150 controls the communication unit 130 to transmit ID information of the display apparatus stored in the storage unit 140 to the external apparatus, and downloads an application program previously determined to correspond to the transmitted ID information from the external apparatus by the push method, and executes a predetermined function using the downloaded and executed application program.

Here, the use input unit (not shown) may be provided to the display apparatus in a button type, or may be provided in various types such as a remote controller, a keyboard, etc. connected by a wire or wirelessly with the display apparatus.

The control unit 150 may control the communication unit 130 to transmit the stored ID information of the display apparatus to the external apparatus 200, and to receive an authority information corresponding to the ID information so that the authority information can be stored in the storage unit 140. Accordingly, the control unit 150 may request from the external apparatus 200 information about application programs being transmitted to the display apparatus corresponding to the authority information, update information about the installed application program, information about all installable application programs, etc. The requested message may be generated and transmitted to the external apparatus 200 by controlling the message generating unit 160. Accordingly, if information corresponding to the requested message is received from the external apparatus 200, the control unit 150 downloads an application program from the external apparatus 200 by the push method based on the information, and executes the application program, thereby performing a predetermined function using the executed application program in the display apparatus.

The message generating unit 160 may generate a message requesting information about an application program previously determined to correspond to the authority information received from the external apparatus 200.

Here, the previously determined application program means an application program previously determined to correspond to the display apparatus based on the authority information. That is, since the authority information is generated to be different depending on the ID information, the previously determined application program means an application program previously determined to correspond to the display apparatus based on the ID information including at least one of model information including a manufacture date of a display apparatus, firmware information, a region/nation and a set language.

Here, the previously determined information of the application program may include the name, the size, version information, etc. of the application program.

The control unit 150 of the display apparatus may control the message generating unit 160 to generate a message requesting information of an application program previously determined to correspond to authority information of the display apparatus. The control unit 150 may control the communication unit 130 to transmit the generated message to the external apparatus 200, and to receive information about an application program identified or described in the message from the external apparatus 200. Accordingly, the display apparatus of an exemplary embodiment can receive information including the type, the size, the name and version information of the application program previously determined to correspond to the authority information.

The control unit 150 of the display apparatus may control the message generating unit 160 to generate a message requesting information of all application programs which are determined to correspond to authority information. The control unit 150 may control the communication unit 130 to transmit the generated message to the external apparatus 200, and to receive information of all application programs determined to be described in the message from the external apparatus 200. Accordingly, the display apparatus according to an exemplary embodiment can receive information including the type, the size, the name and version information, etc. of all application programs determined to correspond to the authority information.

Here, the application program is a program supplying various widget services to the display apparatus, and may include a software program executing various contents such as a data information, that is, an electronic program guide (EPG) information, news, weather, stock, fortune, YouTube motion picture service, etc. in addition to a video information.

Accordingly, the application program executing various contents may be different depending on model information, firmware information, a region or a nation in which a corresponding display apparatus is used, or a set language which should be displayed in the display unit 120. Therefore, information about an application program previously determined depending on authority information corresponding to ID information of the display apparatus may be different.

The comparison unit 170 may compare information about an application program received from an external apparatus in response to a message generated by the message generating unit 160, and information of an application program currently installed in the display apparatus.

Accordingly, if information about an application program from an external apparatus is received, the control unit 150 can control the comparison unit 170 to compare the type, the size, the name and version information of a received application program, and the type, the size, the name and version information of an application program previously installed in the display apparatus.

The comparison result produced by the comparison unit 170 from the received information about the application program may include an application program that needs to be additionally installed, current application program that needs to be deleted, current application program that needs to be updates, and a current application program that is the same as the application program identified by the received information. If an application program is not installed in the display apparatus and should be additionally installed, or if an application program which is previously installed in the display apparatus should be deleted, or if an application program which is previously installed but needs a version update since there is a difference in version information, the comparison unit 170 may transmit the comparison result to the control unit 150. Accordingly, the control unit 150 may update the installed application program depending on the comparison result produced by the comparison unit 170.

Here, in the updating, depending on the comparison result, an application program that is needed to be additionally installed may be downloaded from the external apparatus, or an application program already installed may be updated to a newer version, or an application program already installed may be deleted.

FIG. 2 is a block diagram of a display apparatus system according to an exemplary embodiment of the present invention.

The display apparatus system includes a display apparatus 100 and an external apparatus 200. Here, the display apparatus may have analogous configuration to the exemplary display apparatus depicted in FIG. 1.

The external apparatus 200 includes a communication unit 210, a confirmation unit 220, an authority information generating unit 230, a storage unit 240 and a control unit 250.

The communication unit 210 performs an IP based network communication with the display apparatus 100, and may be embodied by all of wire and wireless communications. Accordingly, the communication unit 210 may perform a wire network communication connected by a cable, a coaxial cable or an optical cable to the network. Also, the communication unit 210 may perform a wireless network communication such as a wireless wide area network (WWAN) performing a communication intermediated by a base station of a portable terminal or a wireless local area network (WLAN) performing a communication intermediated by an access point (AP) in order to be connected to an internet. Accordingly, the communication unit 210 may include a communication protocol necessary to perform the wire or wireless network communication. Here, the external apparatus 200 includes a base station, a person computer, a server or a web server capable of a wire or a wireless network communication with the display apparatus 100.

Accordingly, the communication unit 210 may receive ID information of the display apparatus 100 from the display apparatus 100 by using the IP based network communication.

If ID information is received from the display apparatus 100, the confirmation unit 220 checks to confirm whether authority information corresponding to the ID information is generated or not. If the authority information corresponding to the ID information is not generated, the result of this check is transmitted to the control unit 250, and the control unit 250 controls the authority information generating unit 230 to generate authority information corresponding to the ID information.

If the authority information corresponding to the ID information is generated, this result is also transmitted to the control unit 250.

The authority information generating unit 230 generates authority information corresponding to ID information of the display apparatus 100 received through the communication unit 210. Accordingly, if the ID information of the display apparatus 100 is received through the communication unit 210, the control unit 250 controls the confirmation unit 220 to confirm whether or not there is authority information corresponding to the ID information. If the confirmation unit 220 confirms that there is no authority information corresponding to the ID information, the control unit 250 controls the authority information generating unit 230 to generate authority information corresponding to the ID information.

Here, the authority information may be generated to correspond to ID information including model information including a manufacture date of the display apparatus 100, firmware information, a use region or nation and a language set in the display apparatus 100. The region/nation information may be obtained from a geolocation IP (GeoIP) connected to the external apparatus 200 through the communication unit 130 of the display apparatus 100, and information about a language used in the region/nation of the display apparatus may be obtained.

Here, if authority information corresponding to the ID information is generated, the control unit 250 controls the communication unit 210 to transmit the authority information to the corresponding display apparatus.

The storage unit 240 may store together the generated authority information and ID information about the corresponding display apparatus. Accordingly, if the authority information is generated by the authority information generating unit 230, the control unit 250 controls the storage unit 240 to store together the generated authority information and the ID information of the corresponding display apparatus.

Also, the storage unit 240 stores information about an application program corresponding to the authority information. That is, the storing unit 240 stores the size, the name, the type, version information, etc. of an application program previously determined (based on the ID information of the display apparatus) to correspond to the authority information (for example, model information including a manufacture date of a display apparatus, firmware information, a region/nation and a language set in the display apparatus). Also, the storage unit 240 stores the size, the name, the type, version information, etc. of all application programs that can be installed in the display apparatus based on the ID information of the display apparatus that corresponds to the authority information.

If a message requesting information about an application program that corresponds to authority information is received from a display apparatus, the authority information of which is confirmed by the confirmation unit 220, the control unit 250 may control the communication unit 210 to transmit information about an application program, which is stored in the storage unit 240 and which is identified by the request message, to the display apparatus 100.

If a message received from the display apparatus 100 requests information about an application previously determined to correspond to authority information of the display apparatus 100, the control unit 250 may control the communication unit 210 to transmit to the display apparatus 100 information about the type, the size, the name, version information, etc. of an application that is determined to correspond to the authority information based on a corresponding ID information stored in the storage unit 240 and which may include model information including a manufacture data of the display apparatus 100, firmware information, a region or a nation and a language set for the display apparatus.

If a message received from the display apparatus 100 requests information of all applications capable of being installed on the display apparatus 100 and which correspond to authority information of the display apparatus 100, the control unit 250 may control the communication unit 210 to transmit to the display apparatus 100 information about the type, the size, the name, version information, etc. of all installable application programs based on corresponding ID information which is a base of the authority information stored in the storage unit 240 and which may include model information including manufacturer's data of the display apparatus 100, firmware information, a region or a nation and a language used by the display apparatus.

Here, if the display apparatus 100 receives information of all installable application programs from the external apparatus 200, the control unit 150 of the display apparatus 100 controls the comparison unit 170 to compare information of all received installable application programs and information of an application program currently installed. Information of an application program not already installed in the display device is cataloged as a comparison result and transmitted to the control unit 150. The display apparatus 100 may further include a user interface (UI) generating unit (not shown). Accordingly, the control unit 150 may control the UI generating unit (not shown) to generate a UI representing a catalogue received from the comparing unit 170 and display the generated UI on the display unit 120. Also, the display apparatus 100 may further include a user input unit (not shown) which receives user selection of one of the generated UI.

Accordingly, if one of the generated UI is selected by the user input unit, the control unit 150 may download an application program corresponding to the selected item from the external apparatus 200 by the push method and execute the application program in the display apparatus 100.

Figure 3:
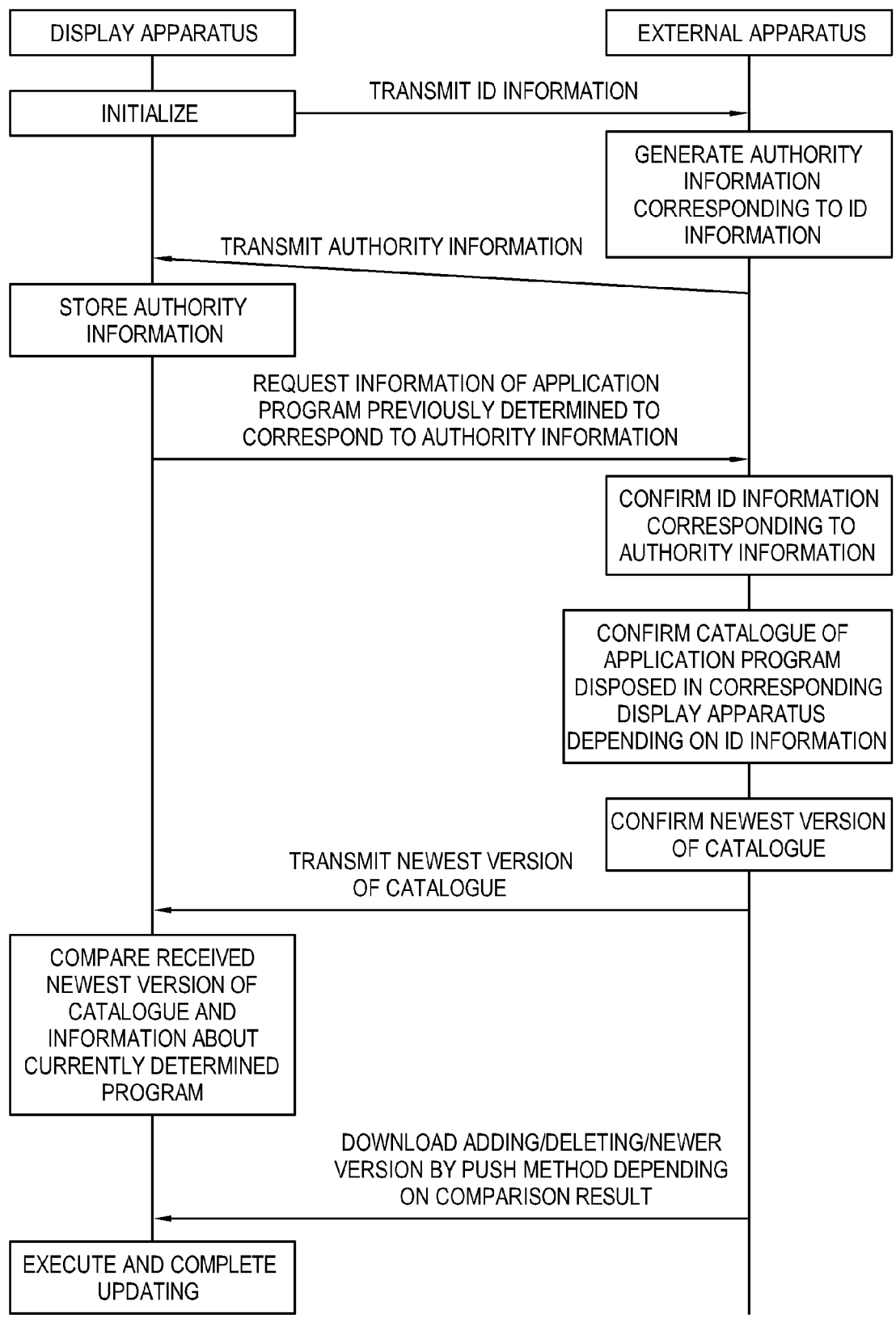
FIG. 3 illustrates an example describing a control operation of a display apparatus system according to an exemplary embodiment of the present invention.

FIG. 3 illustrates an example describing a control operation of a display apparatus system according to an exemplary embodiment.

As shown in FIG. 3, if the display apparatus 100 receives an electric power turning on signal from the user input unit, or if the communication unit 130 performs a communication operation, the control unit 150 of the display apparatus 100 initializes the display apparatus and controls the communication unit 130 to transmit ID information of the display apparatus 100 to the external apparatus 200.

If the ID information is received from the display apparatus 100, first, the confirmation unit 220 of the external apparatus 200 confirms a GeoIP of the display apparatus 100, and confirms availability of the display apparatus 100 by confirming model information and firmware information from the received ID information. If the availability of the display apparatus 100 is confirmed, the confirmation unit 220 confirms whether or not authority information corresponding to the ID information is generated. If there is no generated authority information, a signal indicating lack of authority information is transmitted to the control unit 250. The control unit 250 generates a profile of the display apparatus 100 with respect to the ID information, the availability of which is confirmed by the confirmation unit 220, and controls the authority information generating unit 230 to generate authority information for the ID information, and controls the storage unit 240 to store the generated profile of the display apparatus and the corresponding authority information. Then, the control unit 250 controls the communication unit 210 to transmit authority information corresponding to the ID information generated by the authority information generating unit 230 to the corresponding display apparatus 100.

If the communication unit 130 of the display apparatus 100 receives authority information from the external apparatus, the control unit 150 of the display apparatus 100 controls the storage unit 140 to store the authority information.

The control unit 150 of the display apparatus 100 controls the message generating unit 160 to generate a message requesting information about an application program previously determined to correspond to the authority information, and controls the communication unit 130 to transmit the generated message to the external apparatus 200.

If the message requesting information about the application program corresponding to the authority information is received from the display apparatus 100, the control unit 250 of the external apparatus 200 controls the confirmation unit 220 to confirm availability of the received authority information. Depending on the result of the confirmation operation, the control unit 250 confirms a profile of the display apparatus 200 corresponding to the authority information stored in the storage unit 240 to extract a catalogue of an application program previously determined depending on a GeoIP, model information, firmware information and a set language of the display apparatus 200, and confirms the newest version of the application program included in the catalogue. Accordingly, the control unit 250 controls the communication unit 210 to transmit the newest version of the catalogue to the display apparatus 100.

If the display apparatus 100 receives the information about the newest version of the application program from the external apparatus 200, the control unit 150 of the display apparatus 100 controls the comparison unit 170 to compare the information about the newest version of the application program received from the external apparatus 200, and information about an application program currently installed in the display apparatus 100. In the comparison result, the control unit 150 selects and downloads application programs to be additionally installed or to be deleted or to be updated to a new version, and executes the application program to allow a predetermined function to be performed.

According to an exemplary embodiment the display apparatus 100 may be released without previously installing an application program needed in the display apparatus 100 in a manufacturing thereof. That is, after the display apparatus 100 according to an exemplary embodiment is manufactured and is sold to a user, if the communication unit 130 performs a communication operation when the user initially turns on the display apparatus 100 or an electric power turning on signal happens in the display apparatus 100, the control unit 150 of the display apparatus 100 may control the communication unit 130 to transmit ID information of the display apparatus 100 to an external apparatus 200, receive authority information, and download and install an application program previously determined to correspond to the authority information.

According to an exemplary embodiment, in the display apparatus system, the external apparatus 200 may actively manage an application program that is being determined based on model information, firmware information, a region/nation and a set language of the display apparatus 100. For example, if a policy with respect to contents is changed depending on the region/nation, a contents policy changed depending on the region/nation is reflected so that an application program corresponding to the region/nation stored in the storage unit 240 of the external apparatus 200 can be added, deleted or version-updated.

Also, the control unit 150 of the display apparatus 100 may control the message generating unit 160 to generate a message requesting information about an application program previously determined in a previously determined period. For example, in case that the display apparatus 100 receives an electric power turning on signal, or in case that the communication unit 130 performs a communication operation may be included.

Also, region/nation information of the display apparatus 100 according to an exemplary embodiment may be obtained by the communication unit 130 of the display apparatus 100 through a GeoIP in performing an IP based network communication. Accordingly, if a nation of the display apparatus 100 is changed from the United States of America to Korea, and if an electric power turning on signal is initially received in Korea or the communication unit 130 initially performs an IP based network communicating operation in Korea, the control unit 150 of the display apparatus 100 controls the message generating unit 160 to generate a message requesting information about an application program previously determined to correspond to Korea (region information/nation information), and transmits through the communication unit 130 so that information about an application program appropriate to a Korean circumstance can be received from the external apparatus 200 for an update of the display apparatus 100.

Figure 4:
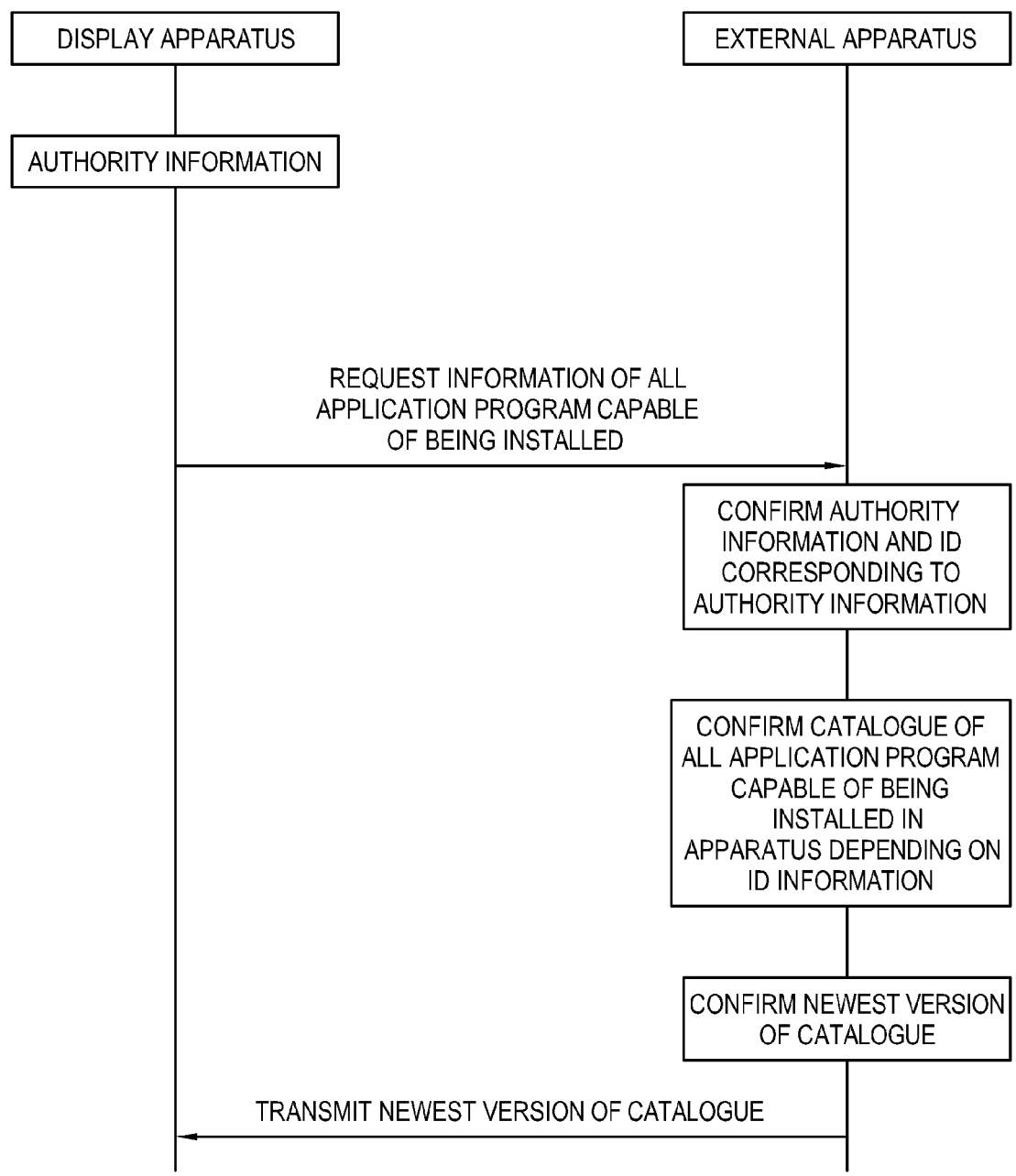
FIG. 4 illustrates another example describing a control operation of a display apparatus system according to an exemplary embodiment of the present invention.

FIG. 4 illustrates another example describing a control operation of a display apparatus system according to an exemplary embodiment.

As shown in FIG. 4, if a message requesting information about all installable application programs corresponding to an authority information of a display apparatus, the authority information of which is already generated, the external apparatus 200 controls the confirmation unit 220 checks to confirm availability of the authority information. If the authority information is determined to be available, a profile of the display apparatus 100 generated to correspond to the authority information is confirmed to confirm a catalogue of all installable application programs depending on each of model information, firmware information, a region/nation and a set language of the display apparatus 100. Also, the newest version information of each application program included in the catalogue is confirmed, and the information is transmitted to the display apparatus 100.

If the display apparatus 100 receives the information of newest versions of all installable application programs that correspond to the authority information from the external apparatus 200, the control unit 150 of the display apparatus 100 controls the comparison unit 170 to compare the information of newest versions of all installable application programs received from the external apparatus 200, and information about an application program previously installed in the display apparatus 100. The control unit 150 controls a UI generating unit (not shown) to generate a UI representing an information catalogue of an application program which is not currently installed as a comparison result, and displays the generated UI in the display unit 120 of the display apparatus 100. If there is an item selected by the user input unit in the UI displayed in the display unit 120, updating of the selected item can be performed.

Figure 5:
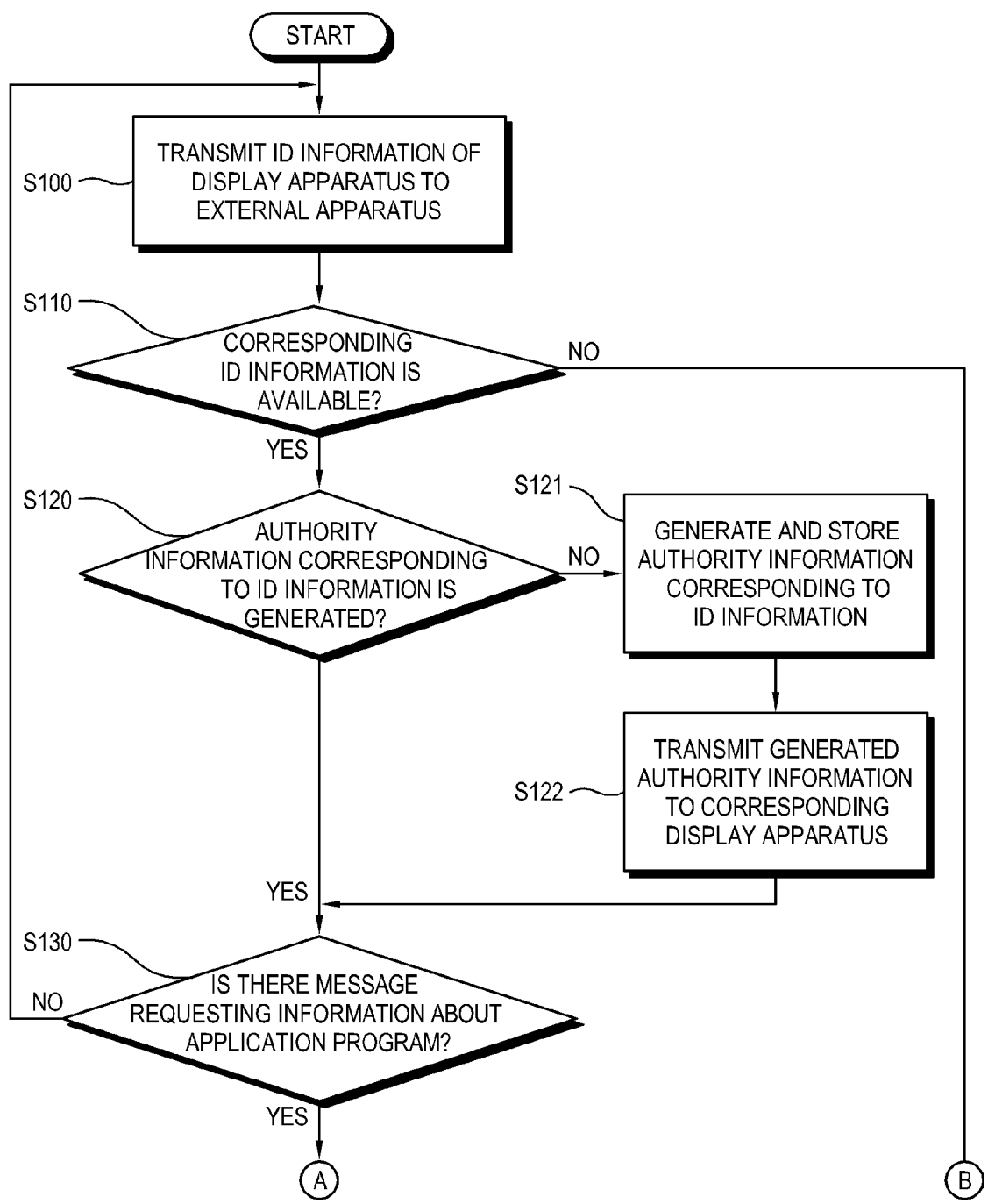
FIGS. 5 and 6 are flowcharts illustrating a control operation of an application program of a display apparatus system according to an exemplary embodiment of the present invention.
Figure 6:
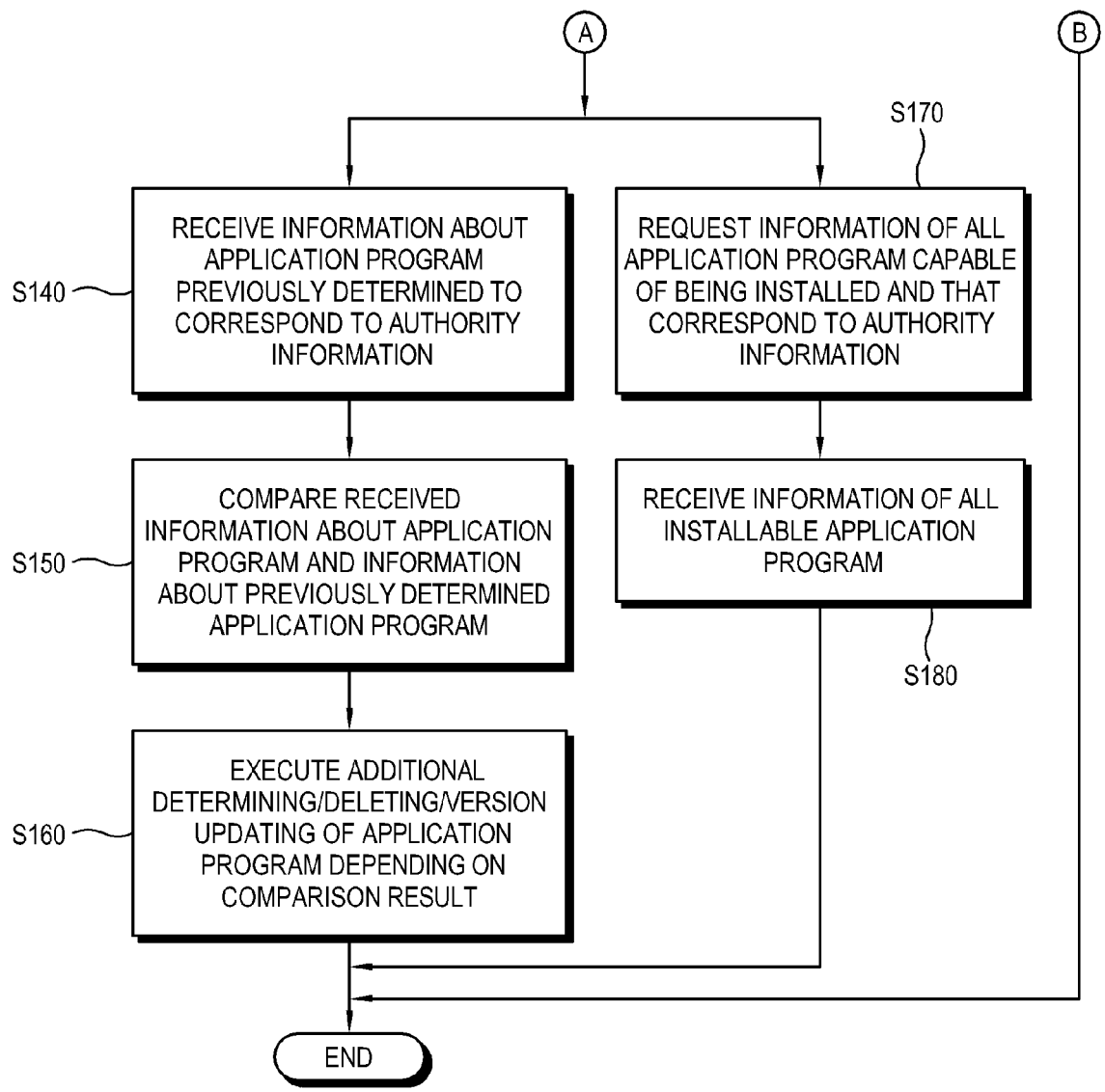

FIGS. 5 and 6 are flowcharts illustrating a control operation of an application program of a display apparatus system according to an exemplary embodiment of the present invention.

If the display apparatus 100 receives an electric power turning on signal, or the communication unit 130 starts to perform a communication operation, the display apparatus 100 transmits ID information to the external apparatus 200 (S100). If the external apparatus 200 receives the ID information, the confirmation unit 220 checks to confirm the received ID information to confirm a GeoIP, model information and firmware information of the display apparatus 100 corresponding to the ID information (S110).

If availability of the display apparatus 100 is confirmed (Yes in operation S110), the confirmation unit 220 confirms whether or not authority information corresponding to the ID information of the display apparatus 100 is generated (S120).

If there is no generated authority information corresponding to the ID information (No in operation S120), the control unit 250 of the external apparatus 200 controls the authority information generating unit 230 to generate authority information corresponding to the ID information, and stores the ID information and the generated authority information in the storage unit 240 (S121). Also, the control unit 250 controls the communication unit 210 to transmit the generated authority information to the display apparatus 100 that corresponds to the ID information (S122).

If the authority information corresponding to the ID information is generated (Yes in operation S120), it is confirmed whether or not a message requesting information about an application program corresponding to the authority information is received from the display apparatus 100 that corresponds to the ID information (S130).

If there is the message requesting information about an application program previously determined to correspond to the authority information, the external apparatus 200 transmits information about an application program identified in the message to the display apparatus 100 (S140).

The control unit 150 of the display apparatus 100 controls the comparison unit 170 to compare the information about the application program received from the external apparatus 200 identified in the message, and information about an application program previously installed in the display apparatus 100 (S150), and performs updating such as additionally installing, deleting, a version updating of an application program, etc. depending on the comparison result (S160).

If the message requesting information of all installable application programs corresponding to the authority information is received, the external apparatus 200 transmits information of an application program identified in the message to the display apparatus 100 (S170). Accordingly, the display apparatus 100 receives information about all installable application programs that correspond to the authority information from the external apparatus 200 (S180).

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A control method of a display apparatus system, the control method comprising:
   transmitting an identification (ID) information of a display apparatus to an external apparatus;
   generating an authority information in the external apparatus based on the ID information;
   transmitting the authority information to the display apparatus;
   downloading an application program based on the authority information;
   performing a predetermined function using the downloaded application program; and
   transmitting information corresponding to the received authority information and information on at least one of application programs installed in the display apparatus to the external apparatus when a predetermined event is generated, to determine whether an updating of the at least one of application programs is necessary based on data related to the at least one of application programs received from the external apparatus in response to transmitting the information corresponding to the authority information and the information on at least one of application programs installed in the display apparatus,
   wherein the predetermined event comprises a case that the display apparatus receives an electric power turning on signal or a case that the communication unit prepares for a wire or wireless network communication with the external apparatus and performs a check communication with the external apparatus,
   wherein the ID information comprises at least two of a model information of the display apparatus, a firmware information of the display apparatus, a region information of the display apparatus, and language set in the display apparatus, and
   wherein the authorization information is different for different types of models of the display apparatus.

2. The control method according to claim 1, further comprising storing the received authority information in the memory of the display apparatus.

3. The control method according to claim 1, further comprising transmitting to the external apparatus a message generated in a message generating unit of the display apparatus to request information about an application program determined to correspond to the authority information, and receiving information corresponding to the message from the external apparatus.

4. The control method according to claim 3, further comprising comparing received information about an application program which is identified in the message and information of the application program installed in the display apparatus, and
   performing an updating of the installed application program depending on a comparison result.

5. The control method according to claim 1, further comprising transmitting to the external apparatus a message requesting information about all application programs capable of being installed in the display apparatus which correspond to the authority information, and
   receiving from the external apparatus information about an application program identified in the message.

6. The control method according to claim 1, wherein the controller automatically receives information for updating the application program from the external apparatus to update the application program, in accordance with the transmitting of information corresponding to the received authority information to the external apparatus.

7. The control method of claim 1, wherein the data related to the at least one of application programs received from the external apparatus comprises at least one of a type, a name, a size and a version information thereof.

8. The control method of claim 7, further comprising:
   storing data related to the at least one of application programs corresponding to the authority information, in the external apparatus;
   by the display apparatus, requesting data related to the at least one of application programs stored in the external apparatus;
   comparing the data related to the at least one of application programs received from the external apparatus with data related to the at least one of application programs currently set in the display apparatus, to obtain update information; and
   performing the updating of the at least one of application programs based on the obtained update information.

9. The control method of claim 8, wherein the updating information comprises information on at least one of an application program that needs to be additionally installed, a current application program that needs to be deleted, and a current application program that needs to be updates.

10. The control method of claim 8, wherein the data related to the at least one of application programs is previously determined based on the ID information of the display apparatus corresponding to the authority information.

11. The control method of claim 10, A control method of a display apparatus system, the control method comprising:
    transmitting an identification (ID) information of a display apparatus to an external apparatus;
    generating an authority information in the external apparatus based on the ID information;
    transmitting the authority information to the display apparatus;
    downloading an application program based on the authority information;
    performing a predetermined function using the downloaded application program; and
    transmitting information corresponding to the received authority information and information on at least one of application programs installed in the display apparatus to the external apparatus when a predetermined event is generated, to determine whether an updating of the at least one of application programs is necessary based on data related to the at least one of application programs received from the external apparatus in response to transmitting the information corresponding to the authority information and the information on at least one of application programs installed in the display apparatus, wherein the predetermined event comprises a case that the display apparatus receives an electric power turning on signal or a case that the communication unit prepares for a wire or wireless network communication with the external apparatus and performs a check communication with the external apparatus, wherein the data related to the at least one of application programs received from the external apparatus comprises at least one of a type, a name, a size and a version information thereof, wherein the control method further comprises:

storing data related to the at least one of application programs corresponding to the authority information, in the external apparatus;

by the display apparatus, requesting data related to the at least one of application programs stored in the external apparatus;

comparing the data related to the at least one of application programs received from the external apparatus with data related to the at least one of application programs currently set in the display apparatus, to obtain update information; and performing the updating of the at least one of application programs based on the obtained update information, wherein the data related to the at least one of application programs is previously determined based on the ID information of the display apparatus corresponding to the authority information, and wherein the ID information comprises a model information, a firmware information, a region or nation information, and a language set in the display apparatus.

12. The control method of claim 11, wherein the region or nation information of the display apparatus is updated through a network telecommunication by the display apparatus.

13. A display apparatus, comprising:

a communication unit which performs network communication with an external apparatus; and a controller comprising at least one hardware component and configured to receive from the external apparatus authority information based on an identification information of the display apparatus provided by the display apparatus and configured to transmit information corresponding to the received authority information and information on at least one of application programs installed in the display apparatus to the external apparatus when a predetermined event is generated, to determine whether an updating of the at least one of application programs installed in the display apparatus is necessary based on data related to the at least one of application programs received from the external apparatus in response to transmitting the information corresponding to the authority information and the information on at least one of application programs installed in the display apparatus, wherein the predetermined event comprises a case that the display apparatus receives an electric power turning on signal or a case that the communication unit prepares for a wire or wireless network communication with the external apparatus and performs a check communication with the external apparatus, wherein the identification information comprises at least two of a model information of the display apparatus, a firmware information of the display apparatus, a region information of the display apparatus, and a user language set for the display apparatus, and wherein the authorization information is different for different types of models of the display apparatus.

14. The display apparatus according to claim 13, further comprising a storage unit, which stores the identification information of the display apparatus, wherein the controller controls the storage unit to store the authority information.

15. The display apparatus according to claim 14, further comprising: a message generating unit which generates a message requesting information about an application program previously determined to correspond to the authority information, wherein the controller controls the communication unit to transmit the generated message to the external apparatus, and to receive information about an application program corresponding to the transmitted message.

16. The display apparatus according to claim 15, further comprising a comparison unit which compares information of a received application program which is identified in the message, and information of the application program previously installed in the display apparatus, wherein the controller performs an updating of the installed application program depending on a comparison result from the comparison unit.

17. The display apparatus according to claim 15, wherein the controller controls the message generating unit to generate a message requesting information of all application programs that are configured to be installed in the display apparatus and that correspond to the authority information, and the controller controls the communication unit to transmit the generated message to the external apparatus, and to receive information of an application program corresponding to the transmitted message.

18. The display apparatus of claim 13, wherein the authority information is stored in the external apparatus and the display apparatus.

19. The display apparatus of claim 18, wherein the ID information comprises at least one of a region or nation information of the display apparatus and a user language set for the display apparatus.

20. The display apparatus according to claim 13, wherein the controller automatically receives information for updating the application program from the external apparatus to update the application program, in accordance with the transmitting of information corresponding to the received authority information to the external apparatus.

21. The display apparatus of claim 13, wherein the data related to the at least one of application programs received from the external apparatus comprises at least one of a type, a name, a size and a version information thereof.

22. A display apparatus system, comprising:

a display apparatus which comprises a first communication unit performing a network communication with an external apparatus, and a first controller receiving from the external apparatus authority information based on an identification information of the display apparatus provided by the display apparatus, wherein the controller comprises at least one hardware component; and an external apparatus which comprises a second communication unit performing an IP based network communication with the display apparatus, a memory storing an application program corresponding to the authority information received by the second communication unit, an authority information generating unit, and a second controller controlling the authority information generating unit to generate the authority information based on an identification information of the display apparatus provided by the display apparatus and the second communication unit to transmit the generated authority information to a corresponding display apparatus, and wherein the first controller controls the first communication unit to transmit information corresponding to the received authority information and information on at least one of application programs installed in the display apparatus to the external apparatus when a predetermined event is generated, to determine whether an updating of the at least one of application programs installed in the display apparatus is necessary based on data related to the at least one of application programs received from the external apparatus in response to transmitting the information corresponding to the authority information and the information on at least one of application programs installed in the display apparatus, wherein the predetermined event comprises a case that the display apparatus receives an electric power turning on signal or a case that the communication unit prepares for a wire or wireless network communication with the external apparatus and performs a check communication with the external apparatus, wherein the identification information comprises at least two of a model information of the display apparatus, a firmware information of the display apparatus, a region information of the display apparatus, and a user language set for the display apparatus, and wherein the authorization information is different for different types of models of the display apparatus.

23. The display apparatus system according to claim 22, wherein the second controller controls the memory to store the generated authority information and the corresponding identification information.

24. The display apparatus system according to claim 23, wherein the external apparatus further comprises a confirmation unit confirming existence of the authority information that corresponds to the identification information, and the second controller controls the confirmation unit to confirm whether the authority information corresponding to the received identification information exists.

25. The display apparatus system according to claim 24, wherein, if a message requesting information about a predetermined application program corresponding to the authority information is received from a display apparatus, where the authority information of the predetermined application program is confirmed to correspond to the received identification information, the second controller controls the second communication unit to transmit information about the predetermined application program identified in the message to the display apparatus.

26. The display apparatus system according to claim 22, wherein the controller automatically receives information for updating the application program from the external apparatus to update the application program, in accordance with the transmitting of information corresponding to the received authority information to the external apparatus.

27. The display apparatus system of claim 22, wherein the data related to the at least one of application programs received from the external apparatus comprises at least one of a type, a name, a size and a version information thereof.

28. A display apparatus comprising:
a communication unit which communicates information identifying type of a display apparatus;
a processor configured to determine at least one application program that is configured to execute in the display apparatus, configured to control execution of the at least one application program that is determined to be configured for execution on the display apparatus, configured to receive from an external apparatus authority information based on an identification information of the display apparatus provided by the display apparatus and configured to transmit information corresponding to the received authority information and information on at least one of application programs installed in the display apparatus to the external apparatus when a predetermined event is generated, to determine whether an updating of the at least one of application programs installed in the display apparatus is necessary based on data related to the at least one of application programs received from the external apparatus in response to transmitting the information corresponding to the authority information and the information on at least one of application programs installed in the display apparatus, wherein the at least one program comprises at least one widget service, wherein the predetermined event comprises a case that the display apparatus receives an electric power turning on signal or a case that the communication unit prepares for a wire or wireless network communication with the external apparatus and performs a check communication with the external apparatus, wherein the authorization information is different for different types of models of the display apparatus, wherein the identification information comprises at least two of a model information of the display apparatus, a firmware information of the display apparatus, a region information of the display apparatus, and a user language set for the display apparatus, and wherein the authorization information is different for different types of models of the display apparatus.

29. The display apparatus of claim 28, wherein the processor controls downloading from the external apparatus the at least one application program determined to be configured for execution on the display apparatus and controls performing of a predetermined function using the downloaded application program.

30. The display apparatus of claim 28, wherein the processor controls downloading using a push technique of the at least one application program that is determined to be configured for execution on the display apparatus.

31. The display apparatus of claim 28, wherein:
the at least one program comprises a plurality of programs;
the communication unit communicates a list of the plurality of programs determined to be configured for execution on the display apparatus and receives a user selection of one of the plurality of programs that are determined to be configured for execution on the display apparatus; and
the processor controls execution of the selected program.

32. The display apparatus of claim 28, wherein the at least one program further comprises electronic program guide (EPG) information.

33. The display apparatus according to claim 28, wherein the controller automatically receives information for updating the application program from the external apparatus to update the application program, in accordance with the transmitting of information corresponding to the received authority information to the external apparatus.

34. The display apparatus of claim 28, wherein the data related to the at least one of application programs received from the external apparatus comprises at least one of a type, a name, a size and a version information thereof.

* * * * *